United States Patent [19]

Bird et al.

[11] Patent Number: 4,884,550
[45] Date of Patent: Dec. 5, 1989

[54] INTERNAL COMBUSTION ENGINE

[75] Inventors: John H. Bird, Cobham; Robin K. Waugh, Newbury, both of England

[73] Assignee: Economic Combustion Systems Limited, Corham, England

[21] Appl. No.: 278,461

[22] Filed: Dec. 1, 1988

[30] Foreign Application Priority Data

Dec. 4, 1987 [GB] United Kingdom ............... 8728427

[51] Int. Cl.$^4$ .................................. F02M 23/08
[52] U.S. Cl. .................................. 123/587; 123/327
[58] Field of Search .................. 123/587, 585, 327

[56] References Cited

U.S. PATENT DOCUMENTS

| | | | |
|---|---|---|---|
| 3,744,464 | 7/1973 | Soltau | 123/587 |
| 4,344,406 | 8/1982 | Minor et al. | 123/587 |
| 4,532,900 | 8/1985 | Hibino et al. | 123/587 |
| 4,553,521 | 11/1985 | Kishida et al. | 123/587 |
| 4,569,318 | 2/1986 | Fujimura et al. | 123/587 |
| 4,586,481 | 5/1986 | Kishida et al. | 123/587 |
| 4,594,977 | 6/1986 | Shimamura et al. | 123/587 |
| 4,677,959 | 7/1987 | Suzuki et al. | 123/587 |

FOREIGN PATENT DOCUMENTS

| | | | |
|---|---|---|---|
| 0189623 | 8/1988 | Japan | 123/585 |
| 2036864 | 7/1980 | United Kingdom | 123/585 |

Primary Examiner—Willis R. Wolfe
Assistant Examiner—Marguerite Macy
Attorney, Agent, or Firm—Oliff & Berridge

[57] ABSTRACT

An air and fuel mixing, modulating and supply means for a spark ignition internal combustion engine includes an air inlet manifold in effective connection with air and fuel metering means including a throttle. Two separate passages are provided which passages include holes in the inlet manifold. Each passage is controlled by a respective valve. Control means open or close the valves depending on engine condition. The first larger passage is effective to reduce engine vacuum when the engine speed is greater than a 1,000 rpm and the throttle is closed. The second smaller passage is effective to allow a small amount of additional air into the inlet manifold when the throttle is open and the engine speed is above 1,500 rpm.

6 Claims, 2 Drawing Sheets

INTERNAL COMBUSTION ENGINE

The present invention relates to an air and fuel supply means for an internal combustion engine.

Gasoline fuelled spark ignition internal combustion engines are the most common source of motive power for current automobiles. As the worlds petroleum resources diminish, the cost of petroleum based fuels, such as gasoline, will continue to rise. Accordingly, it is highly desirable, in order to reduce vehicle running costs and conserve scarce resources, to reduce the fuel consumption of gasoline fuelled engines DE-A-3008349 discloses an air and fuel mixing, modulating and supply means for a spark ignition internal combustion engine including: an inlet manifold for supplying air and fuel to the engine; air and fuel metering means, including a throttle, in effective connection with said inlet manifold; means defining a passage located between the air and fuel metering means and the engine and connected to a first valve means to relieve vacuum and hence suction of unwanted fuel to the combustion chamber; a second valve means for admitting additional air to the combustion chamber to reduce fuel consumption. It should be noted that both valves act on the same passage. Control means, are disclosed for controlling the valves, including means to determine the crankshaft speed of the engine and means to determine the throttle position. When the crankshaft speed is greater than a first predetermined value and the throttle is substantially closed the control means causes the first valve means to open and to allow additional air to enter the air inlet manifold.

A disadvantage of an engine having an air supply means according to this document is that the power of the engine is adversely affected by the fuel saving apparatus, because the first valve acting through the passage excessively dilutes the fuel when the engine has to generate full power or a large proportion of full power, for example, for overtaking or for travelling on a road with a rising gradient. The fuel saving apparatus thus has to be switched off and both valve means closed. A disadvantage in consequence of the above is that this system relies on driver participation to switch the system on and off by means of a hand switch.

Additionally the air supply means according to DE 3008349 adversly affects the servo assisted braking of vehicles to which it is fitted. Consequently the fuel saving apparatus is automatically switched off during braking when used on vehicles with servo assisted braking.

An object of the present invention is to provide an improved air and fuel supply means for an internal combustion engine. The object is achieved by adding a small additional passage controlled by the second valve to the apparatus disclosed in DE 3008349. This passage enhances combustion by allowing a carefully controlled amount of additional air to enter the manifold. This allows the enhancement to be achieved over the whole operating range above idling speed. The first larger passage serves only to relieve engine vacuum.

An advantage of the present invention is that an engine with such air supply means exhibits lower fuel consumption characteristics than a conventional internal combustion engine of similar size. Furthermore, and unexpectedly, far from adversely affecting the power of the engine, an engine modified according to the present invention exhibits higher power outputs in comparison with engines of conventional construction and similar size. Consequently the fuel saving apparatus can be left on at all times and does not need to be switched off when full power is required.

The first and second passages are usually provided by simple holes in the manifold though compound holes can be employed. "Large" and "small" are used as indicative of the capability to transmit air.

In a preferred embodiment the first passage has an effective cross sectional area at least twice that of the second passage.

The valves can be opened and closed in response either when the engine reaches preset speeds, in response to changes in engine speed or in response to both preset speeds and changes in engine speed.

Specific embodiments of the present invention will now be described, by way of example only, with reference to the accompanying drawings in which.

Figure 1:
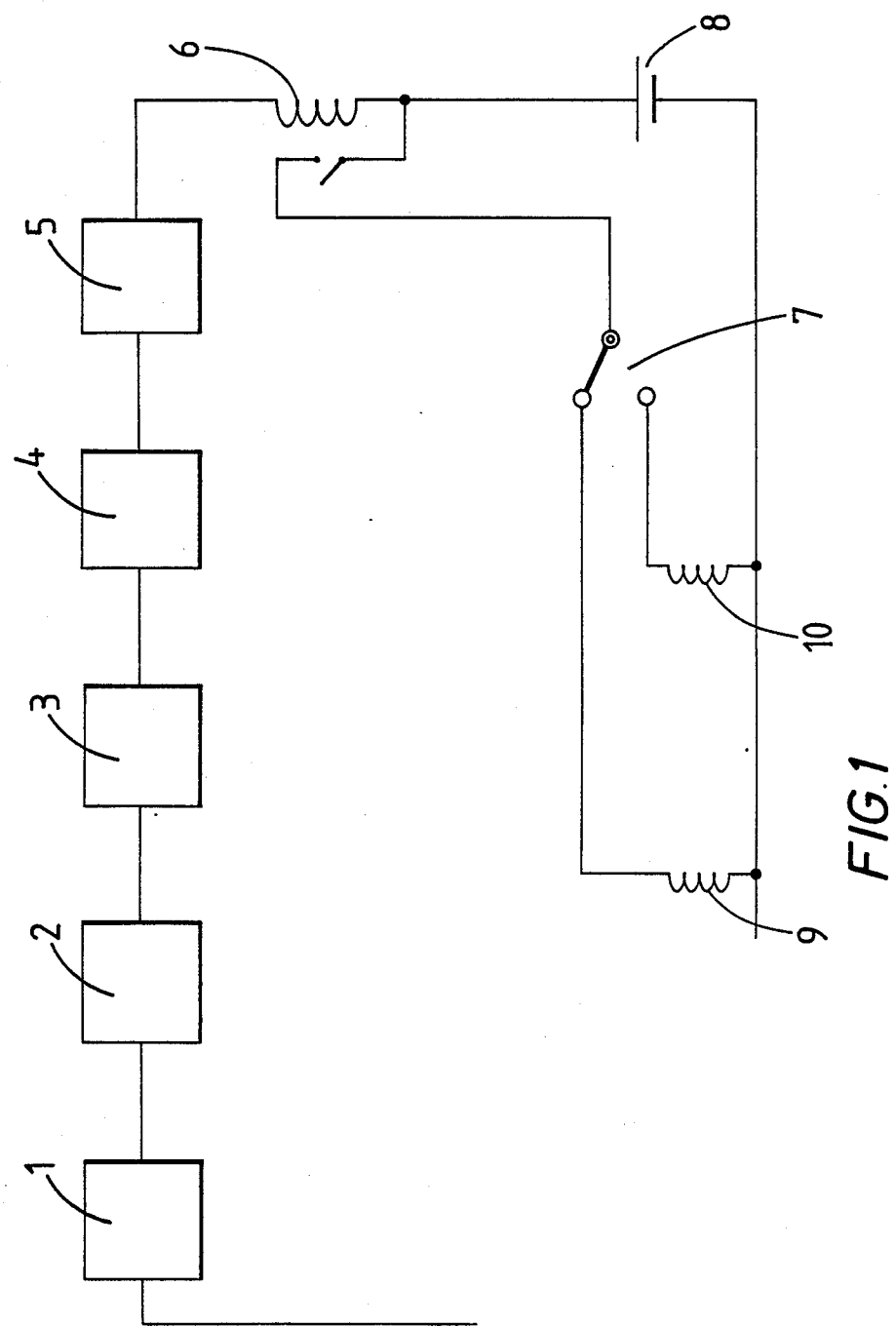
FIG. 1 is a schematic diagram of apparatus control means embodying the present invention.

The control means comprises conventional electronic components providing a filter 1, a switch 2, a charge pump 3, a level detector 4, a buffer amplifier 5, a relay 6, and a micro switch 7. The filter 1 is connected to the switch side of a engine's ignition coil (not shown) to receive a pulsating electrical output from the coil. The filter 1, switch 2 and charge pump 3 comprise a speed switch which produces a DC voltage output proportional to the frequency of the pulses received from the coil. This frequency is proportional to the speed of the engine to which the coil is attached. The output of the charge pump is fed into the level detector 4, which is connected via the buffer amplifier 5 to the relay 6. The level detector is set to close the switch in the relay 6 when the DC voltage applied thereto reaches a value corresponding to a predetermined frequency of pulses from the coil and a known engine speed.

The relay 6 is connected between a battery 8, or other source of electrical power, and the micro switch 7. When the relay 6 is closed, the circuit between the switch 7 and battery 8 is completed. Dependent upon its position, the micro switch 7 completes a circuit between the relay 6 and a vacuum valve 9, or an air valve 10. Both the vacuum and air valves 9 and 10 are solenoid activated, normally closed valves, which in use are fitted in effective connection to an associated engine's inlet tract or manifold so as to vent the inlet tract or manifold to the atmosphere when open. When power is fed to the vacuum valve 9 it is caused to open and, when the power is fed to the air valve 10 it is caused to open. The size of the opening controlled by the valves 9 and 10 is selected for optimum results with a particular internal combustion engine.

Figure 2:
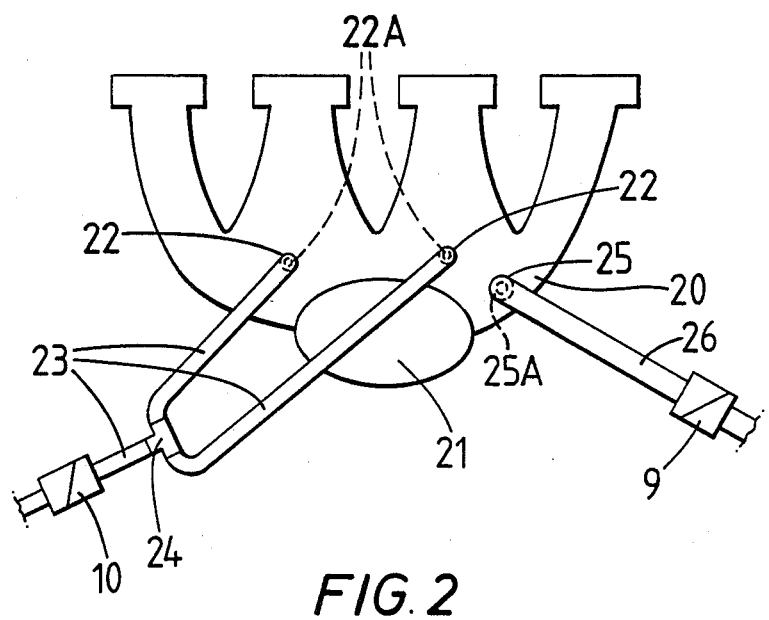
FIG. 2 is a schematic view of an engine inlet manifold embodying the present invention.

Referring to FIG. 2 an inlet manifold for an engine, not illustrated, is shown at 20. A carburettor is shown at 21. Two ⅛" BSP nozzles, 22A, have been fitted into, apertures or holes, 22, in the manifold. These are connected by means of nylon hose, 23, and a "T" piece connector, 24, to the air valve 10. The position of the holes and nozzles on the manifold is chosen to give an even flow of air to each area of the manifold.

A larger hole, 25, is also drilled in the manifold and fitted with a ⅜" BSP nozzle, 25A. This is connected by ⅜" reinforced nylon hose to the vacuum release valve 9.

The larger hole, 25, is capable of letting more air through to the engine than the smaller holes, 22 and thus usually has a greater cross sectional area.

In use, the micro switch 7 is linked to an engine's throttle or throttles such that it completes the circuit between the air valve 10 and the relay 6 when the throttle is open and the circuit between the vacuum valve 9 and the relay 6 when the throttle is substantially closed.

In a typical automotive application, the control means is arranged to cause the relay 6 to close at a pulse rate corresponding to a crankshaft speed of between 1500 and 2000 revolutions per minute. From this crankshaft speed upwards one of the vacuum valve 9, or the air valve 10 will be open; the air valve 9 will be open at all times when the throttle is opened and, the vacuum valve will be opened when the throttle is substantially closed in the idle position. The micro switch 7 may be conveniently located so that it is actuated by the vehicle's accelerator pedal.

The size of the air valve 10 and its associated hole(s) is determined for a particular installation by experimentation and is chosen to give optimum fuel consumption, whilst maintaining good driveability. The number of holes in the manifold for connection to the air valve varies depending on the manifold design and air flow through it. It is important that the hole(s) are the correct size. If too much extra air is supplied to the engine then this will result in incomplete combustion of the fuel, an increase in pollution emissions and a loss in power. The size of the vacuum valve 9 is chosen so that only enough air may enter the open valve to reduce the vacuum within the inlet tract to a level at which vacuum driven devices, such as brake servos, remain operative. Optionally, a further switch in the power line to the vacuum valve 9 may be incorporated, which causes the air valve 9 to shut whenever the vehicle braking system is operated. With such an option, a larger vacuum valve may be employed so that inlet tract pressures may be kept closer to atmospheric.

In a second embodiment of the present invention the micro switch can be replaced by using a second speed switch similar to speed switch (1,2,3). This second speed switch also produces a voltage output proportional to the engine speed. Output is fed to a second level detector which switches the relay and hence closes the air valve 10 and opens vacuum 1 valve, 9, when the engine speed, i.e. rpm decreases. In use the air valve will open at a speed of, depending on the vehicle, between 1500 and 2000 rpm. On a reduction in speed the air valve closes and the vacuum valve opens. The vacuum release valve, is kept open until a preset speed, which can be as low as 1000 rpm.

In a further embodiment the air valve is controlled by the speed switch as described in the second embodiment. An inductive proximity switch is mounted near the accelerator pedal to control the vacuum valve. When the accelerator pedal is released the air valve is closed as above, and the vacuum valve is opened.

Alternatively the inductive proximity switch can be replaced by fixing a sensor potentiometer switch to the accelerator pedal.

In tests, it has been found that when existing internal combustion engines have been fitted with apparatus in accordance with the present invention, the average fuel consumption of these engines has improved by between 8 and 20%. Furthermore, useful reductions in the emissions of both unburned hydrocarbons and carbon monoxide have been achieved through the fitting of apparatus in accordance with the present invention.

The following results illustrate the improvements which use of apparatus in accordance with the present invention is capable of achieving. A test route of 115 miles having a first leg of approximately 30 miles across country, followed by a second leg and third leg, each of approximately 30 miles on a motorway, followed by a final fourth leg of approximately 30 miles across country was used. The figures in Table 1 show the fuel consumption of a 1300 cc automobile driven over the four legs of the test route before modification; and the figures given in table 2 show the fuel consumption of the same 1300 cc automobile driven over the same route, after its engine had been fitted with apparatus in accordance with the present invention.

TABLE 1

| MILES | MPG | JOURNEY |
|---|---|---|
| 27.0 | 37.87 | Country to Motorway (1) |
| 30.0 | 40.16 | Motorway (2) |
| 31.0 | 41.28 | Motorway (3) |
| 27.0 | 38.08 | Motorway to Country (4) |

TABLE II

| MILES | MPG | JOURNEY |
|---|---|---|
| 26.9 | 45.13 | Country to Motorway (1) |
| 31.1 | 46.35 | Motorway (2) |
| 30.0 | 44.84 | Motorway (3) |
| 27.0 | 45.61 | Motorway to Country (4) |

As can be seen from the above results, the fuel consumption of the vehicle was reduced on each and every leg of the journey. The average fuel consumption for the whole journey was reduced from 39.38 miles per gallon to 45.49 miles per gallon, an improvement of 15.25% over the whole journey.

We claim:

1. An air and fuel mixing modulating and supply means for a spark ignition internal combustion engine comprising;
   an inlet manifold for supplying air and fuel to the engine;
   air and fuel metering means including a throttle; means connecting said air and fuel metering means to said inlet manifold;
   a first valve means;
   means defining a passage located the air and fuel metering means and the engine to said first valve means;
   a second valve means;
   means defining a second passage, located between the air and fuel metering means and the engine and connected to said second valve means;
   control means for controlling the valves including to determine the crankshaft speed of the engine, the arrangement being such that when the crankshaft is greater than a predetermined valve the control causes the second valve means to open to allow additional air to enter the air inlet manifold to enhance combustion, and on a reduction in crankshaft speed the control means causes the first valve means to open, to relieve engine vacuum.

2. An air and fuel mixing modulating and supply means as claimed in claim 1 wherein the effective cross sectional area of the first passage is at least twice the effective cross sectional area of the second passage.

3. An air and fuel mixing modulating and supply means as claimed in claim 1 wherein the means defining each passage include at least one hole in the inlet manifold.

4. An air and fuel mixing modulating and supply means for a spark ignition internal combustion engine comprising; an inlet manifold for supplying air and fuel to the engine;
   air and fuel metering means including a throttle;
   means connecting said air and fuel metering means to said inlet manifold;
   a first valve means;
   means defining a passage located between the air and fuel metering means and the engine and connected to said first valve means;
   a second valve means;
   means defining a second passage located between the air and fuel metering means and the engine and connected to said second valve means; control means for controlling the valves which control means include:
   means to determine the speed of the engine and means to determine the throttle position; the arrangement being such that when the crankshaft speed is greater than a predetermined valve and the throttle is substantially closed, the control means causes the first valve means to open to relieve engine vacuum, and when the crankshaft speed is greater than a predetermined value and the throttle is substantially open the control means causes the second valve means to open to allow additional air to enter the air inlet manifold to enhance combustion.

5. An air and fuel mixing modulating air supply means as claimed in claim 4 wherein the effective cross sectional area of the first passage at least twice that of the second passage.

6. An air and fuel mixing modulating and supply means as claimed in claim 4 wherein each means defining a passage includes at least one aperature in the inlet manifold.

* * * * *